United States Patent [19]
Hoedl

[11] Patent Number: 5,298,098
[45] Date of Patent: Mar. 29, 1994

[54] INDUSTRIAL PALLETS AND METHODS OF MANUFACTURE OF PANEL STRUCTURES

[76] Inventor: Herbert K. Hoedl, R.R. #3, Newmarket, Ontario, Canada, L3Y 4W1

[21] Appl. No.: 716,839
[22] Filed: Jun. 17, 1991
[51] Int. Cl.⁵ .............................................. B23B 31/00
[52] U.S. Cl. .................................. 156/73.1; 156/73.5; 156/293; 264/23
[58] Field of Search ................ 156/73.5, 293, 294, 156/73.1; 264/23

[56] References Cited

U.S. PATENT DOCUMENTS

| | | | |
|---|---|---|---|
| 2,933,428 | 4/1960 | Mueller | 156/294 |
| 2,942,748 | 6/1960 | Anderson | 156/73.1 |
| 3,244,574 | 4/1966 | Decker | 156/382 |
| 3,426,951 | 2/1969 | Pholman . | |
| 3,481,803 | 10/1966 | Hewitt | 156/73.5 |
| 3,610,173 | 5/1971 | McIlwrite . | |
| 4,247,346 | 1/1981 | Maehara | 156/502 |
| 4,909,871 | 3/1990 | Todo | 156/73.1 |
| 5,147,482 | 9/1992 | Miyabayashi | 156/293 |
| 5,174,999 | 12/1992 | Magruder | 424/423 |

FOREIGN PATENT DOCUMENTS

| | | | |
|---|---|---|---|
| 2650037 | 1/1991 | France . | |
| 2009937 | 1/1987 | Japan | 156/293 |
| 1420222 | 1/1976 | United Kingdom . | |

*Primary Examiner*—David A. Simmons
*Assistant Examiner*—Mark DeSimone
*Attorney, Agent, or Firm*—Ridout & Maybee

[57] ABSTRACT

A novel industrial pallet for use in supporting and moving goods, engageable by conventional forklift trucks, comprises an upper platform, one or more lower planar reinforcements and cylindrical spacers therebetween, defining a space suitable for access of the forks of a forklift truck from all sides. Some or all of the components are made of thermoplastic-type materials, so that the structures can be economically and simply made by friction welding (e.g. spin/vibration welding). Alternatively, a thermoplastic material may be positioned between components, to act as a thermoplastic glue of respective parts on friction welding.

8 Claims, 4 Drawing Sheets

INDUSTRIAL PALLETS AND METHODS OF MANUFACTURE OF PANEL STRUCTURES

FIELD OF THE INVENTION

This invention relates to industrial pallets, of the type used in industry for supporting goods so that they can be lifted by forklift trucks transported and stored.

BACKGROUND AND PRIOR ART

The common industrial pallet is made of wood. It is provided with similar top and bottom continuous or slatted surfaces, spaced apart by wooden blocks, elongated wooden spacers/reinforcements and side walls to provide a gap of appropriate size therebetween, to give access to the lifting forks of a forklift truck from two or four sides. Such pallets should be robust and rugged in construction, to withstand the weight of goods stacked on them and lifted on top of them, and to withstand the impacts of truck forks driven into them as a result of misalignment. They are commonly made in a variety of different shapes and sizes. They may be nailed, screwed or riveted together, using the particular design and choice of wood appropriate for their particular use and the loads they are intended to carry.

Such wooden pallets, in particular those made of softwood, are disposable, one-way items. They are sufficiently cheap in terms of raw materials and manufacturing costs, and also sufficiently heavy and bulky, that their return transportation when empty is not economic. However, they are prone to damage in use, and on exposure to weather. In addition, many manufacturing environments do not tolerate wood dust or loose splinters, nails, rivets etc. Since in addition such pallets pose significant disposal problems, there are legislative moves to reduce or eliminate their use.

Reusable, returnable industrial pallets are also known. These are normally made of thermoplastics or thermosetting materials, by processes of injection molding or compression molding. These processes of manufacture require relatively high investment in both tooling and machinery. Moreover, the high cost for the plastics raw materials contribute to the relatively high overall cost of such pallets.

Friction welding, e.g. spin welding, vibration welding etc., is a technique which has previously been used, in one industrial area, to form permanent connections between lengths of thermoplastic pipe, by rotating one or both ends of the pipes under pressure against each other. It has also been used, in another industrial area, to weld the thermoplastic reinforcement of an automobile bumper into the thermoplastic front fascia by vibrating both surfaces under pressure against each other. It relies upon the heat generated by friction in the relative movement of one surface relative to another, under conditions of pressure contact between the respective surfaces. As a result, the thermoplastic material of one or both of the surfaces melts, and on cooling, a union is formed with the thermoplastic material of the other surface, to form a thermoplastic weld on cooling.

It is an object of the present invention to provide novel returnable industrial pallets.

It is a further object to provide an economical process for producing such pallets and other similar industrial structures, so that the resulting products are relatively cheap but at the same time strong and durable.

SUMMARY OF THE INVENTION

The present invention provides a novel form of returnable industrial pallet which is strong, durable and light weight, and which can be economically manufactured. It is made at least in part from thermoplastic materials, or at any rate, from materials having thermoplastic characteristics rendering it suitable for friction welding. The parts can be pre-cut or pre-molded, and shipped in convenient, knocked down from to the site of use, and there assembled by a friction welding technique. It has been found, in accordance with this invention, that the ends of cylindrical, thermoplastics items can be effectively but economically spin welded or vibration welded to planar thermoplastic surfaces, thereby providing a particularly advantageous, novel structure for industrial pallets and similar panels, and is simple and economical method for their manufacture.

Thus, from a first aspect, the present invention provides an industrial pallet for supporting and moving goods, comprising:

an upper planar goods receiving platform;
a lower planar reinforcement;
cylindrical spacers disposed between the upper platform and the lower reinforcement, each spacer having a rigid connection at one end to a lower surface of said upper platform, and a rigid connection at the other end to an upper surface of the reinforcement;
at least one of said rigid connections being comprised of a thermoplastic weld;
said cylindrical spacers each having a length suitable to space the upper platform from the lower reinforcement a distance of from about 1-9 inches.

BRIEF REFERENCE TO THE DRAWINGS

DESCRIPTION OF THE PREFERRED EMBODIMENTS

Figure 1:
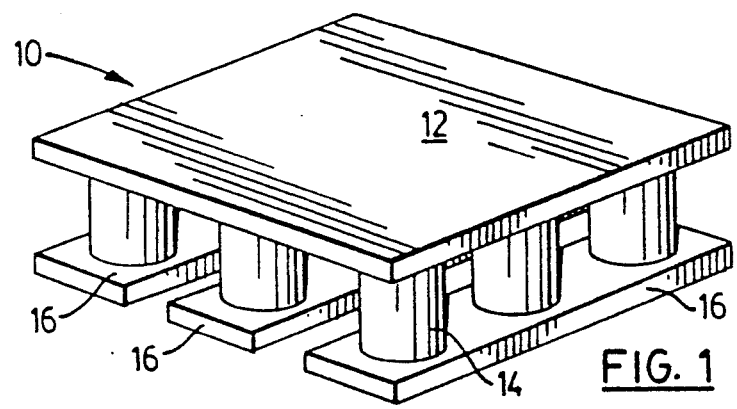
FIG. 1 is a perspective view, of an assembled industrial pallet according to the present invention.

Preferably, the cylindrical spacers are hollow, so as to reduce the overall weight of the pallet, and to provide for ease of manufacture as described below. The provision of cylindrical spacers allows for ready deflection of the tongs of the forklift truck to one side or other should the tongs be introduced into the space defined by the cylindrical spacers at a misalignment. This reduces the risk of damage caused by impact of the forks of the forklift truck. Cylindrical spacers with thermoplastic characteristics at least at their ends are most easily handled for assembly by the spin welding techniques preferred herein.

The materials of construction of the various components can be chosen from a wide variety, depending upon the design and intended use of the resultant pallet, with the proviso that the combination must be friction weldable together. Thus, at least one of the components must have thermoplastic characteristics. When the platform and the spacers are both thermoplastic materials, and when the spacers and the reinforcement are both thermoplastic materials, they can be friction welded together. When neither of the adjoining parts to be secured together is thermoplastic, it is necessary to place, at the junction site, a reservoir of thermoplastic material to form a thermoplastic glue to bond the components on friction welding.

It is preferred to use thermoplastic materials for the cylindrical spacers, in the embodiments of the invention.

When the same thermoplastic material is chosen for the upper platform and for the cylindrical spacer, e.g. polyethylene, they can be directly friction welded together, by spin and/or vibration welding, without the provision of special grooves, receptor slots or the like. The end of the cylinder will frictionally weld directly to the flat surface of the platform. The same of course applies to the cylindrical spacer and the lower reinforcement. When the adjacent components are of dissimilar thermoplastic materials, e.g. polyethylene/polypropylene, polyethylene/ABS, polypropylene/ABS, etc., it is preferred to provided a positioning groove, slot, undercut or other formation on the undersurface of the platform and/or the top surface of the reinforcement, for effective positioning and friction welding of the cylinder end thereto. Where all of the components are made from materials which are unsuitable for friction welding, a receptor slot, groove or similar formation is provided on the undersurface of the platform and/or the top surface of the reinforcement, and a ring of suitable thermoplastic material, e.g. polyethylene, is positioned within that formation. Then, spin or vibration welding of the cylindrical spacer within the receptor slot is achieved by melting the thermoplastic ring as a result of the friction welding process, and causing the molten thermoplastic to act as a thermoplastic glue.

According to a further aspect of the invention, there is provided a process of manufacturing an industrial panel having a platform, a planar reinforcement and a plurality of hollow cylindrical spacers disposed therebetween and having their annular ends thermoplastically welded to a surface of the platform and a surface of the reinforcement, said process comprising:

placing a first end of at least one of said cylindrical spacers against a surface of the platform, at a predetermined location thereon;

placing a second end of said cylindrical spacer against a surface of the platform, at a predetermined location thereon;

placing a second end of said cylindrical spacer against a surface of the planar reinforcement, at a predetermined location thereon;

and rotating the cylindrical spacer, under pressure, about its longitudinal axis, to effect friction welding of the cylindrical spacer to the platform and the reinforcement.

In this aspect of the present invention, where the contacting surfaces are both made of the same thermoplastic material, such a union of the two surfaces is effected, to form a full friction thermoplastic weld. This also occurs when the respective materials are not exactly the same, but have a high degree of compatibility with one another.

When non-compatible thermoplastics are subjected to the same process, the resulting friction thermoplastic weld is not based on the formation of a union between the two surfaces, but rather on a mechanical anchoring of both surfaces to each other. In such cases, undercuts are preferably provided on the outside and/or inside surfaces of the cylindrical spacers, close their ends, or alternatively in the platform surface or in the reinforcement surface. The friction thermoplastic weld now achieved is derived not only from the melting of one or both of the materials, as they move relative to one another, but also on the softening of the end of the spacers and the deformation of them under pressure. If only one of the surfaces is made from a thermoplastic material, this one surface melts under the heat generated by the friction, to act as a melt glue after cooling. The presence of undercuts improves the welding strength in such situations. When neither of the surfaces are made of thermoplastic components, a thermoplastic material, suitable for friction welding, is placed between the two relatively moving surfaces, and softened and melted in the same way. The soften/molten thermoplastic material deforms or flows under pressure, into surface perocities and undercuts provided in the adjoining formations, to anchor both pieces together after cooling.

In this aspect of the present invention, friction welding is used to bond the end of a cylindrical spacer to the under surface of the planar platform, and also, to bond the other end of the cylindrical spacers to the planar reinforcement. Accordingly, only the cylindrical spacers are rotated/vibrated under pressure to cause the melting of the thermoplastic material and effect the weld. For welding the cylindrical spacers to the lower reinforcements, apertures may be cut into the reinforcement at appropriate locations, of a size such that the end of the cylindrical spacer overlies the aperture as it is pressed against the surface, so that tool access to the interior of the cylinder, for spin driving purposes, is provided.

For this purpose, the cylindrical spacers may be hollow or semi-hollow, and provided on their interior surfaces with appropriate configurations to allow positive engagement with a complementarily shaped mandrel or spinning tool. After the tool has engaged the spacer, its movement is started and pressure is applied to the moving surfaces, from the opposing sides of the platform and/or the reinforcement, or both, if simultaneous welding of the two ends of the cylindrical spacer is being effected. Heat is thus generated on the touching surfaces, and softening or melting of the thermoplastic materials occurs. After sufficient of the material has been softened or melted, the movement of the tool is stopped, but the pressure is kept applied to the hot surfaces for a few extra seconds. Then the tool can be retracted and the finished pallet can be removed, achieving its full strength after approximately 2-3 minutes of cooling. In a similar manner, apertures may be provided in the platform also, into which or over which the ends of the cylindrical spacers may be positioned for spin welding. Then the rotation tool can enter from the top, through the platform. In the finished pallet, any such residual apertures in the platform can be fitted with rubber liners or closure plugs, to provide anti-skid characteristics to the load receiving surface of the finished pallet.

The cylindrical spacers are preferably hollow or semi-hollow, not only to reduce the weight of the resulting pallet and to provide access to the inside of the spacers for the rotating mandrel, but also to improve the efficiency of the friction welding process. Spinning or vibrating the hollow spacers concentrates the heat on the relatively narrow top and bottom edges of the spacers which contact the respective surfaces, and avoids dissipation of the heat over the continuous circular area of a solid cylinder. Accordingly, less energy is required with hollow cylinders, to achieve the necessary weld.

Spin welding machines are readily available, and are relatively inexpensive. Accordingly, pallets of the present invention can conveniently be assembled by spin welding at the site of their intended use. The individual components, namely the cylindrical spacers, the upper platforms and the lower strip members, may require manufacture by relatively expensive techniques such as injection molding and compression molding and this is conveniently conducted at a central location, where the components can be made in large numbers. Then the components can be shipped as parts ready for assembly by spin welding at the users location.

Thus, according to a further aspect of the present invention, there is provided a kit of parts adapted to be assembled into an industrial pallet as defined above, and comprising:

a planar sheet-like upper platform;

a plurality of thermoplastic cylindrical members, thermoplastically spin weldable to the sheet-like platform;

a planar reinforcement thermoplastically spin weldable to said cylindrical members.

SPECIFIC DESCRIPTION OF THE MOST PREFERRED EMBODIMENT

Figure 2:
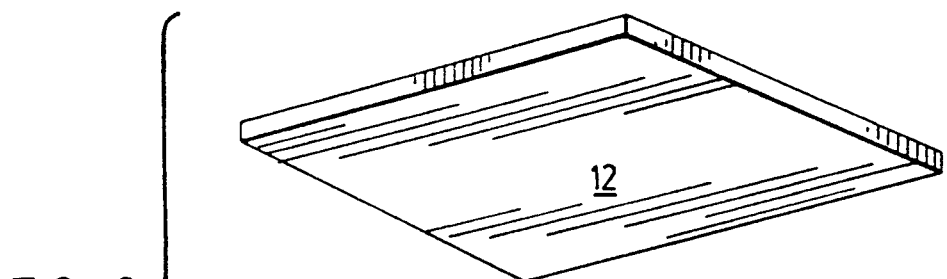
FIG. 2 is an exploded perspective of the pallet of FIG. 1, showing the individual components thereof, and which comprise a kit of parts according to the present invention.

FIG. 1 diagrammatically illustrates a pallet 10 having an upper sheet like platform 12, a plurality of cylindrical spacers 14 and three mutually parallel lower reinforcements 16, spaced apart from one another and spaced equally from the platform by a distance corresponding to the length of the cylindrical spacers 14, this distance being typically of the order of one to four inches. As shown in FIG. 2, the platform member 12 prior to assembly is a planar sheet, typically of thermoplastic material for example polypropylene. The cylindrical spacers 14, also suitably of polypropylene, are injection or compression molded, or constitute pieces of extruded pipe, and are hollow. The lower reinforcements 16 each have three apertures 18 cut there through, or molded therein, of a size equal to or smaller than the size of the interior aperture in the cylindrical spacer. The lower reinforcements are suitably of the same material as the platform 12, e.g. polypropylene. The industrial pallet of this invention in its simplest form is manufactured from sheet and pipe. The reinforcements 16 are suitably prepared by trimming oversize sheets, leaving a main portion to form the platform member 12 and severed strip portions to form the reinforcements 16. Then they are appropriately cut or drilled to provide the apertures 18, appropriately of about 3.7 inches diameter. Next, a pipe with an outer diameter of 4" and an inner diameter of 3.7", having a pair of inwardly projecting, radially opposed continuous ridges or ribs, with an equal width and a height of about 0.15" for engagement of a rotation tool, is cut into 4" long segments to form the spacers.

Figure 2A:
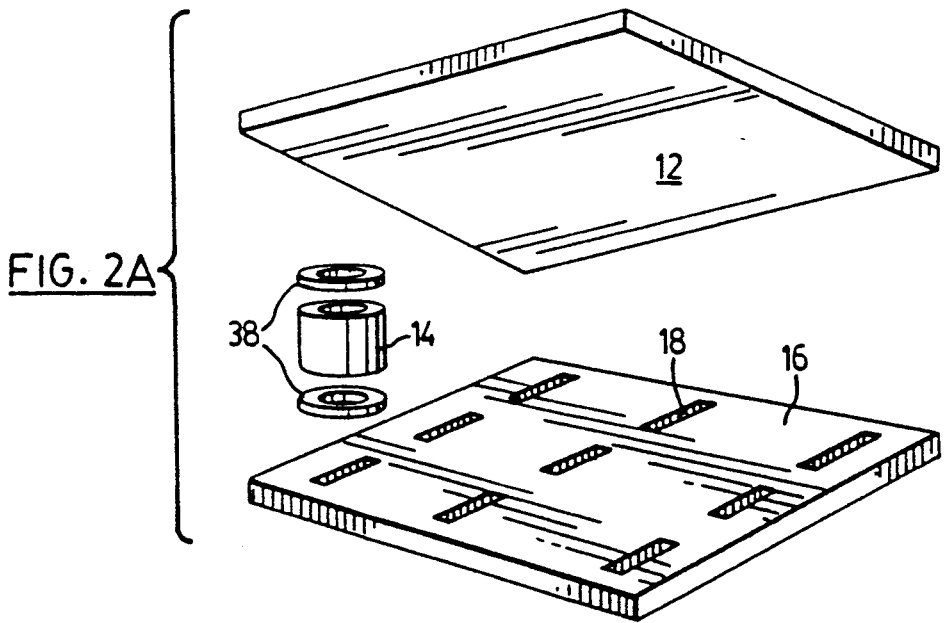
FIG. 2A is a view similar to the that of FIG. 2, but illustrating an alternative embodiment.

FIG. 2A shows, similarly to FIG. 2, a platform member 12 in the form of a planar sheet, but a reinforcement 16 also in the form of a planar sheet, provided with slotted apertures 18 over which the spacers 14 are positioned, and through which a spin welding tool can be inserted. In this embodiment, the cylindrical ends of spacers 14 are both friction welded to planar surfaces, and so, to improve the weld strength, a welding aid 38 in the form of a ring of thermoplastic glue is provided on each end of spacer 14.

Figure 3A:
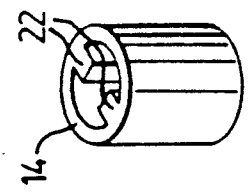
FIG. 3A is a spacer for use in the process of FIG. 3.
Figure 3:
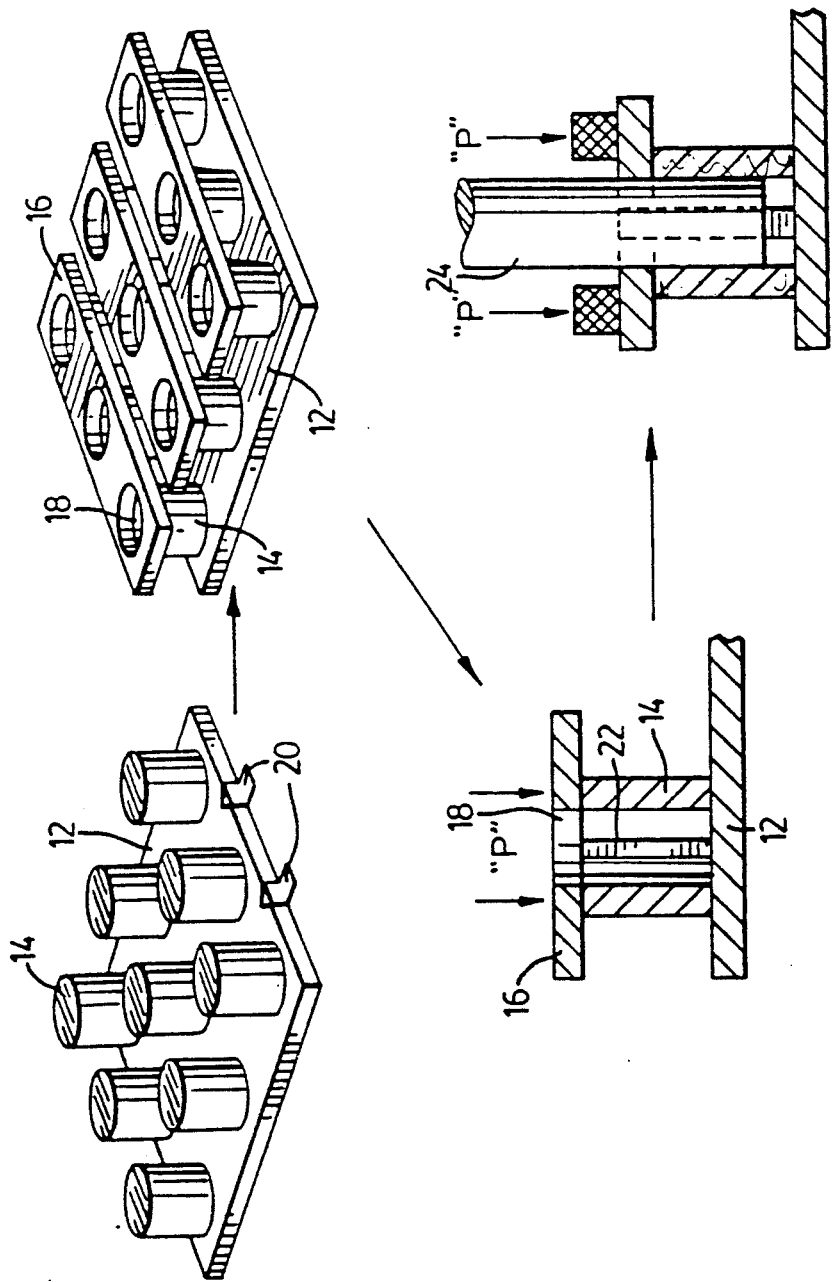
FIG. 3 is a manufacturing process flow diagram, illustrating the method of manufacture and assembly of the pallets from the components illustrated in FIG. 2.

The process of manufacture of a pallet 10 from the component parts shown in FIG. 2 is diagrammatically illustrated in FIG. 3. The platform 12 is clamped in a face-down position by means of holders 20, and the required plurality of cylindrical spacers 14 is placed thereon at predetermined locations, with an end in contact with the surface of the platform 12 and the other protruding upwardly. Then, the reinforcements 16 are placed on the free ends of the cylindrical spacers 14, with the apertures 18 aligning with the inner diameter of the cylindrical spacers 14. Next, a rotation tool 24, with a length of 3.7" and with a cross section virtually identical to the inner shape of the pipe, is inserted through the apertures to a depth of 3.5" into the spacers 14. As shown in FIG. 3A, these spacers 14 conveniently have a pair of inwardly projecting, radially opposed ridges 22. Whilst holding the platform 12 and the reinforcements 16 in fixed position, the rotation tool 24 starts slowly to rotate, engaging the ridges 22 in the spacer 14 so as to rotate the spacer 14 there with. The speed is increased and once the spacer has reached its optimal rotating speed, pressure "P" is increasingly applied to the assembly, from the exterior of the reinforcements 16, especially around the surface engaging portions of the spacers 14. The friction heat generated at the contacting surfaces causes first softening and then melting of the thermoplastic material in these areas. Once enough material is molten in these areas, the rotating tool and consequently the spacer 14 stop rotation, but the maximum pressure "P" is still applied for about 5 seconds after which the rotating tool is retracted and finished pallet can be removed. After cooling of approximately 2-3 minutes, the full strength of the welded areas is achieved.

Conveniently, a multi-mandrel spinning/vibrating machine is used, with the mandrels 24 appropriately spaced so that one row of or all of the cylindrical spacers 14 are engaged and rotated at one time, simultaneously to form the spin welds to unite the parts and form the pallet 10 illustrated in FIG. 1.

Figure 4B:
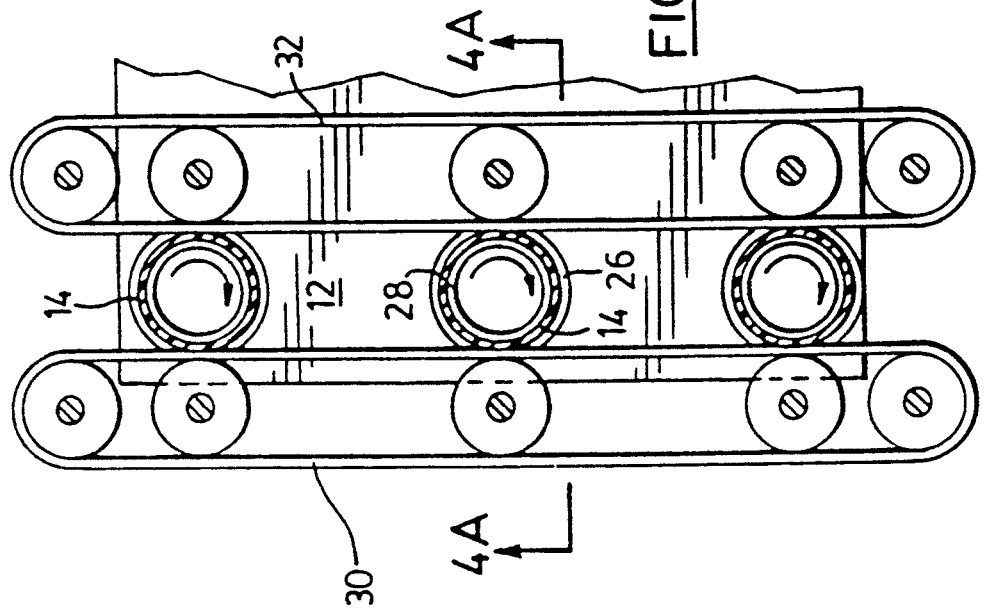
FIG. 4a is a cross-sectional view and FIG. 4b is a plan view illustrating diagrammatically an alternative step in the manufacture of a pallet according to the present invention.
Figure 4A:
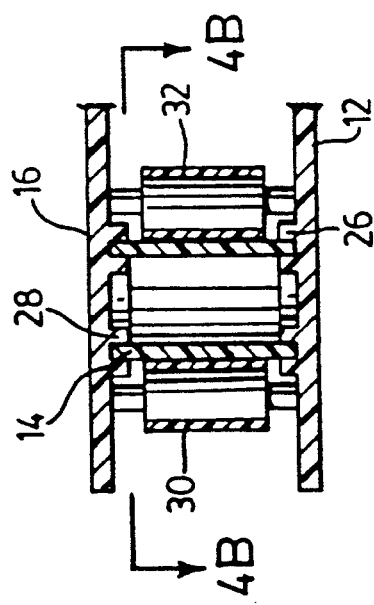

FIGS. 4a and 4b illustrate an alternative process or manufacturing pallets according to another embodiment of the present invention. In this case, both the platform 12 and the reinforcements 16 are provided with integral groove formations 26, 28 respectively, facing each other and in registry with one another. The groove formations are circular, and the width of the groove opening is sufficient to receive the walls of cylindrical spacer 14 in close engagement therewith and to allow the melted thermoplastic material, generated during the spin welding, to flow between the inner and outer edge of the spacer 14 and the inside of the groove, thus generating a shear joint. Friction belts 30, 32 are provided, to press against and engage frictionally the outer surfaces of the cylindrical spacers 14, between the platform 12 and reinforcements 16. These friction belts are moved at high speed in opposite directions so as to cause rotation of the cylindrical spacers 14 relative to the platform 12 and the reinforcements 16, and thereby effect the thermoplastic spin weld under increasing pressure "P" at the upper and lower ends of the spacers 16. In this way, spin welds are formed simultaneously by rows of aligned cylindrical members 14, to form the finished pallet 10.

Figure 5:
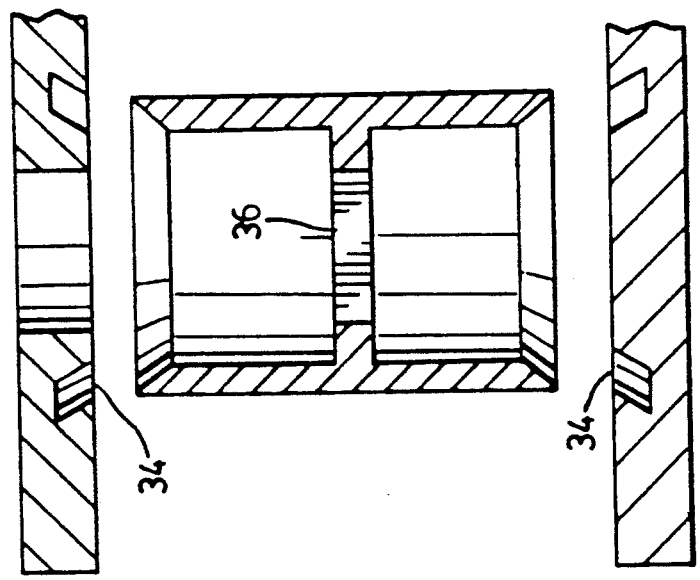
FIG. 5 is a diagrammatic cross sectional view, in exploded form, of an arrangement of parts having undercuts to improve the friction weld.

A large number of variations are possible within the scope of the present invention. Thus, grooves in the platform surface and in the lower reinforcements surfaces can be of a wide variety of shapes, including undercuts 34 as shown in the arrangement of FIG. 5. This particular arrangement provides an improved anchoring of, for example, a thermoplastic spacer 14 in a non-thermoplastic platform 12 and reinforcement 16. The grooves, whatever their configuration, should constitute surfaces of revolution, to receive the ends of the cylindrical spacers in a loose close fit and permit relative rotation thereof to form the thermoplastic spin welds. Similarly, the spacer 14, having a circular shape on both ends, can have a variety of internal shapes, including inner longitudinal transverse ribs with rectangular apertures therethrough, as shown at 36 in FIG. 5, to allow a variety of different rotation/vibration tools to engage mechanically. When vibration welding is used as the joining method, the engagement of the rotation tool is in both rotational directions. "Vibration" as the term is used herein means circular motion about the longitudinal axis sequentially and rapidly in clockwise and anti-clockwise directions, with sudden reversals of such direction. Rotation tools can have expandable gripping formations to engage against the inner surfaces of the cylindrical spacers 14, so that the provision of engaging formations such as ribs 22 on the interior of the cylinders is not necessary. Clearly, a wide variety of engaging formations can be adopted if desired.

Figure 6:
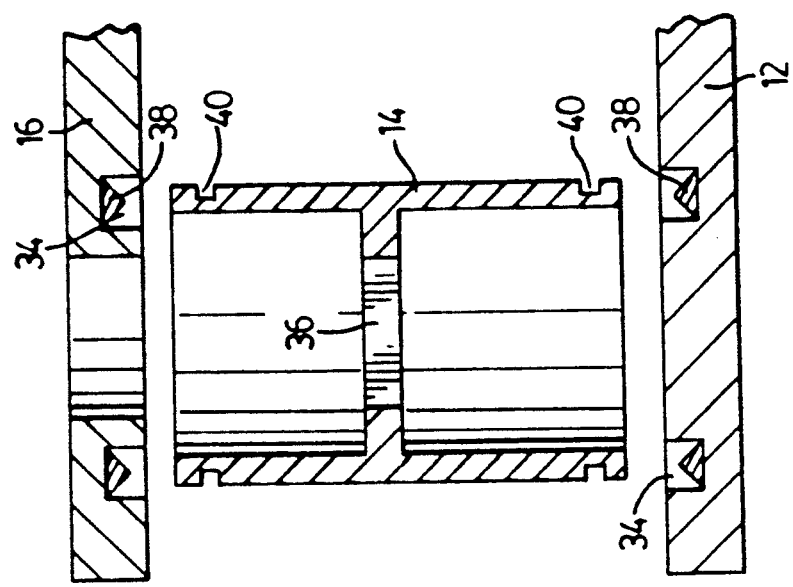
FIG. 6 is a similar view of an alternative embodiment employing a separate thermoplastic reservoir to achieve the thermoplastic weld.

FIG. 6 diagrammatically illustrates an arrangement of spacer 14, reinforcement 16 and platform 12 for use in the case when none of these components are themselves thermoplastic. They could for example, be SMC-thermoset polyester sheet molding compound. In this case, a welding aid 38, in the form of a ring of polyethylene, similar to that of FIG. 2A is placed in the bottom of circular grooves 34 of the non-thermoplastic platform and reinforcement. By rotating the spacers 14 under pressure "P" in the way described above, the welding aid 38 is heated by friction, melts and starts to flow under pressured "P" to fill the space between the spacer 14 and the groove 34, providing after cooling a shear joint of high strength. By providing undercuts 40 in the outer rim of the spacer 14, or alternatively in the grooves 34, additional strength can be achieved. The pallets and other structures according to the invention can be made from and made of recycle material.

I claim:

1. A process of manufacturing an industrial pallet having a platform, a planar reinforcement and a plurality of hollow cylindrical spacers disposed therebetween, said spacers having thermoplastic end portions and said platform and reinforcements having thermoplastic portions to contact the ends of the spacers, said process comprising:

placing opposed ends of at least one of said cylindrical spacers in thermoplastic contact with the thermoplastic portion of the platform and the thermoplastic portion of the reinforcement;

and holding the platform and the reinforcement stationary whilst the cylindrical spacer is rotated relatively thereto under pressure, about its longitudinal axis, to effect simultaneous friction welding of the cylindrical spacer to the platform and the reinforcement.

2. A process of manufacturing an industrial pallet having a platform, a planer reinforcement, and a plurality of hollow cylindrical spacers disposed therebetween, said spacers having thermoplastic portions to contact the ends of the spacers, said process comprising:

placing opposed ends of at least one of said cylindrical spacers in thermoplastic contact with the thermoplastic portion of the platform and the thermoplastic portion of the reinforcement;

and holding the platform and the reinforcement stationary whilst the cylindrical spacer is vibrated relatively thereto under pressure, about its longitudinal axis, to effect simultaneous friction welding of the cylindrical spacer to the platform and the reinforcement.

3. The process of claim 1 or claim 2 wherein the cylindrical spacer is gripped for rotation by gripping means disposed within the cylindrical spacer.

4. The process of claim 3 wherein the reinforcement or the platform is apertured at the location of contact with the cylindrical spacer and the gripping means protrude through the aperture in the reinforcement or the platform into the interior of the cylindrical spacer.

5. The process of claim 1 or claim 2 wherein the cylindrical spacers are gripped for rotation by gripping means disposed exteriorly thereof.

6. The process of claim 1 or claim 2 including the initial steps of cutting strips off a planar sheet of material having thermoplastic characteristics to form the platform and the reinforcements, and cutting apertures through said reinforcements of a size and shape substantially corresponding to an the internal size and shape of the cylindrical spacers.

7. The process of claim 4 wherein the gripping means effect rotation of the cylindrical spacer about its longitudinal axis, relative to the platform and the reinforcement.

8. The process of claim 5 wherein the cylindrical spacer is gripped for rotation by means of friction belts contacting the exterior surface thereof.

* * * * *